United States Patent [19]

Eminger

[11] Patent Number: 4,751,946
[45] Date of Patent: Jun. 21, 1988

[54] SHED WINDING MACHINE
[75] Inventor: Robert J. Eminger, Fort Wayne, Ind.
[73] Assignee: Windamatic Systems, Inc., Fort Wayne, Ind.
[21] Appl. No.: 7,008
[22] Filed: Jan. 27, 1987
[51] Int. Cl.[4] .................................. B21F 3/04
[52] U.S. Cl. .............................. 140/92.1; 74/68
[58] Field of Search ............ 140/92.1; 74/68; 242/1 R, 7.14

[56] References Cited

U.S. PATENT DOCUMENTS

| | | | |
|---|---|---|---|
| 3,066,542 | 12/1952 | Einhiple | 74/68 |
| 3,732,897 | 5/1973 | Arnold et al. | 140/92.1 |
| 3,874,424 | 4/1975 | Muskulus | 140/92.1 |
| 3,964,525 | 6/1976 | Arnold et al. | 140/92.1 |

FOREIGN PATENT DOCUMENTS

| | | | |
|---|---|---|---|
| 86285 | 9/1958 | Denmark | 140/92.1 |
| 2309837 | 9/1974 | Fed. Rep. of Germany | 140/92.1 |

*Primary Examiner*—Lowell A. Larson
*Attorney, Agent, or Firm*—Pearne, Gordon, McCoy & Granger

[57] ABSTRACT

A shed-type coil winder is disclosed in which a shed form is supported against rotation within a rotating wire feed envelope. Rotation of the shed form is prevented by an eccentric drive. The eccentric drive includes a wire support rotating about a first axis and an eccentric ring rotating about an eccentric axis spaced from and parallel to the first axis. The eccentric ring is driven by a parallelogram-type linkage so that it rotates with the flyer support in a uniform manner. The eccentric ring engages an eccentric cam on a form support to hold the form support against rotation while the flyer support and the eccentric ring rotate. A window is provided in the eccentric ring through which a wire guide extends with clearance. Consequently, the eccentric drive does not interfere with the rotation of the wire guide system. A jump actuating system is connected to the form support system to axially move the form in a stepwise manner. The jump actuating system includes a linear actuator located laterally outside of the rotating envelope of the wire guide system and connected to the form support through a bearing plate which rotates about the first axis. The jump actuation system is structured so that a relatively small mass is moved with such stepwise movement, permitting very rapid jumps or axial movement of the form with a minimum power requirement. All of the rotating elements of the machine rotate with uniform velocity around their respective centers, so dynamic balance is achieved.

22 Claims, 4 Drawing Sheets 4,751,946

SHED WINDING MACHINE

BACKGROUND OF THE INVENTION

This invention relates generally to coil winders, and more particularly to a novel and improved shed winding machine in which a non-rotating, axially movable shed from support is mounted within a rotating environment and is held against rotation.

PRIOR ART

Winding machines for producing wire coils for dynoelectric machines, such as motors, are well known. Some such machines, usually referred to as "shed winders," provide a non-rotating shed form on which wire coils are wound by a rotating flyer. In such machines, the coils wound on the shed form are "shed" or move to transfer tooling or inserter tooling positioned at the free end of the shed form.

Shed forming machines are usually provided with a wire supply spool located at one end of the flyer feed system and a shed form is provided at the other end. The shed form support is journaled within and supported by the rotating flyer support system. Such structure is required to prevent interference at one end of the machine with the wire moving from the supply spool through the wire guide to the flyer and also to prevent interference at the other end of the machine with the coils passing from the shed form to the transfer tooling or inserter tooling. In effect, the shed form support must be mounted in a rotating environment. However, it is necessary to provide a mechanism which holds the shed form support, and in turn the shed form, against rotation.

One prior art system for preventing rotation of the shed form support is disclosed in U.S. Pat. No. 3,964,525. Such system employs a wobble gear which provides a rotating shuttle passage timed with the rotation of the flyer through which the wire passes. Such patent is incorporated herein by reference. The wobble gear system of such patent is expensive to manufacture and very difficult to assemble. It requires very close tolerances and closely set clearances. In addition, it requires the wire to follow a path including relatively sharp right angle bends. The above-mentioned patent is incorporated herein by reference.

Another system provides a plurality of sliding latches or shuttles which are selectively retracted to clear the wire feed path and then re-extended to hold the shed form support against rotation. Because winding machines run at relatively high speed, such shuttle pins must be manufactured with considerable precision and are subject to wear during operation. Further, such systems require high speed reciprocation, which can produce noise and vibration problems.

SUMMARY OF THE INVENTION

In accordance with the present invention, a novel and improved shed winding mechanism is provided in which a shed form and its support are enclosed within a rotating envelope along which the wire feeds to a rotating flyer. Such mechanism includes an eccentric drive which holds the shed form support against rotation and also provides a rotating window through which the wire feeds to the flyer. Also, the present invention provides a novel and improved jump actuating system which axially moves the shed form with step-type movement.

There are a number of aspects to the present invention. In accordance with one important aspect of the invention, an eccentric drive is provided to lock the shuttle support against rotation and in which all of the moving elements move with uniform rotary movement. Consequently, dynamic balance and quiet operation are easily achieved.

In accordance with another aspect of this invention, an eccentric drive is provided to hold a shed winding form support against rotation without requiring any gearing or reciprocating or sliding parts. Consequently, a mechanism is provided which is relatively low in cost, dependable in operation, and low in maintenance.

In accordance with still another important aspect of this invention, a shed winder is provided with a wire feed path in which the wire feeds with a minimum amount of bending along a path relatively close to the axis of rotation of the flyer. Therefore, the wire and its guides are not subject to excessive stresses or wear.

In accordance with still another aspect of this invention, an improved drive system is provided for positioning an element in a rotating environment and for holding such element against rotation, in which simple journals are utilized for all connecting and supporting structure.

It is still another aspect of this invention to provide a novel and improved jump actuating system for moving the shed form axially with step-type movement in which the mass which must be moved is low and in which the jump actuator is located outside the rotating environment of the wire feed.

These and other aspects of this invention are illustrated in the accompanying drawings, and are more fully described in the following specification.

DETAILED DESCRIPTION OF THE DRAWINGS

Figure 1:
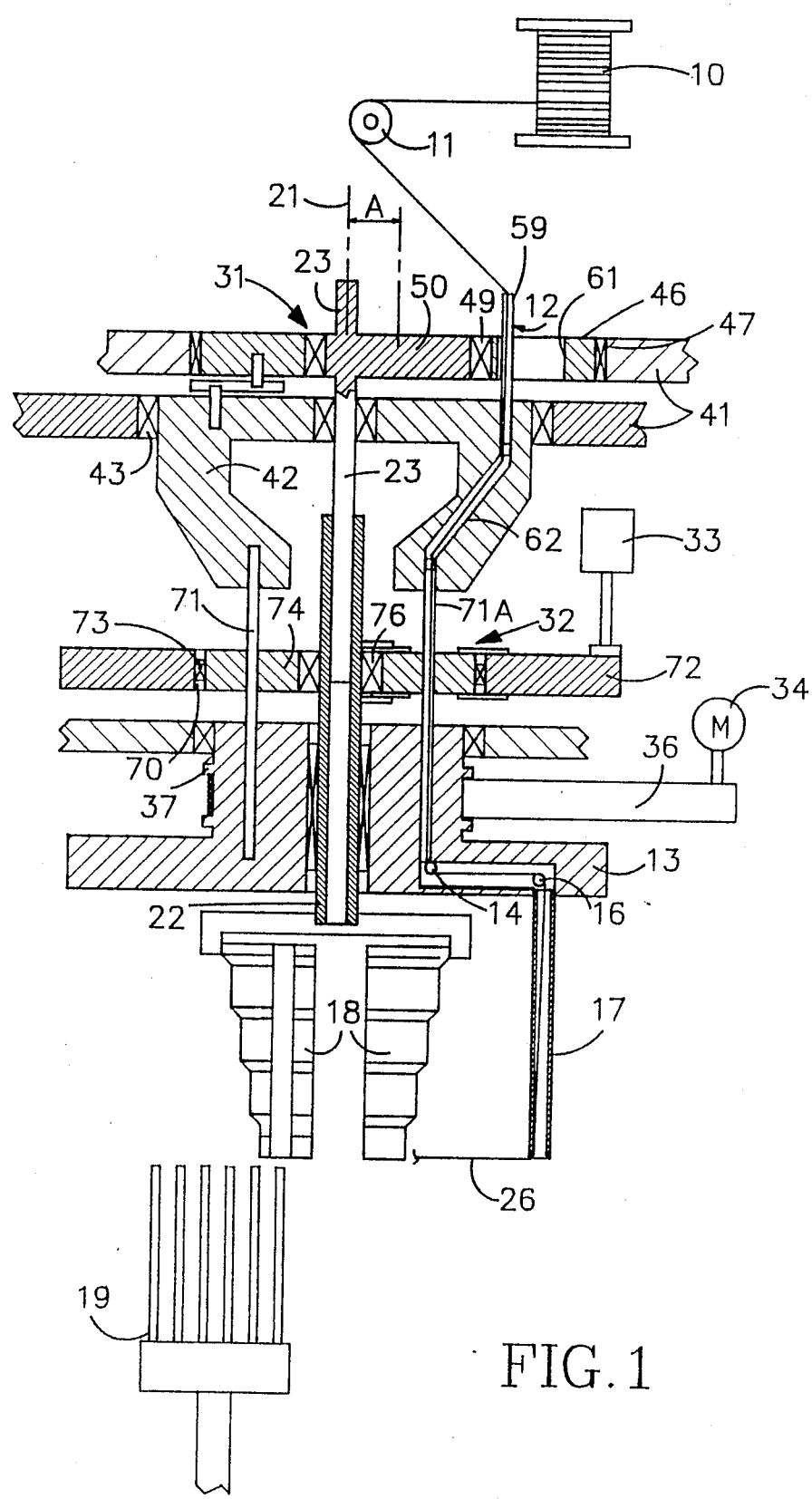
FIG. 1 is schematic illustration of the overall operating system of a shed winder incorporating the present invention.

FIG. 1 schematically illustrates the operating mechanism of a shed winder incorporating the present invention. Wire is supplied from a spool 10 and feeds around a pulley 11 to the entrance of a wire feed passage system 12. The wire is conveyed by the passage system 12 to a flyer 13 having pulleys 14 and 16 over which the wire is directed to a flyer tube 17. The flyer tube rotates around a non-rotating shed form 18 and operates to progressively produce coils on such form. Such coils are "shed" during winding onto transfer tooling or magazine 19. The manner in which coils are sequentially formed on the shed form 18 and are transferred to the transfer tooling 19 is well known to persons skilled in the art.

The entire wire feed passage system 12 and the flyer feed tube 17 rotate about the central axis 21 of the machine. The shed form 18 is mounted on the end of a lower form support shaft 22, which telescopes with an upper form support shaft 23, both of which extend along the central axis 21 of the machine. The two shafts 22 and 23 are connected with an axially extending keyway or spline 25 (illustrated in FIG. 3) so that the two shafts are fixed against relative rotation. However, the lower form support shaft 22 is axially movable so that the form can be stepped axially relative to the lower end of the flyer tube 17 and the transfer tooling 19.

The entire wire feed passage system 12 rotates about the central axis 21 and provides a rotating envelope which encloses the shed form 18 and its two support shafts 22 and 23. Therefore, a system must be provided for maintaining the two shafts 22 and 23 against rotation and for permitting axial movement of the form which will not interfere with the path of the wire movement and which will not interfere with the movement of the coils off the shed form at the lower end.

In accordance with this invention, an eccentric drive system or upper flyer support portion 31 is provided at the upper end of the upper support shaft 23 which functions to lock such shaft against rotation without interfering with the wire feed passage system, as discussed in detail below. Further, a jump drive system 32 interconnects the lower shaft 22 and a jump actuator 33, again without interfering with the rotation of the wire feed passage system. The jump actuator 33 operates to move such shaft 22 and the shed form 18 along the axis 21 in a manner described in detail below. A motor 34 is connected through a belt 36 and a pulley 37 to rotate the wire feed passage system and the flyer 13 around the axis 21 so that the wire 26 is wrapped around the form 18 to produce the coils thereon.

Figure 2:
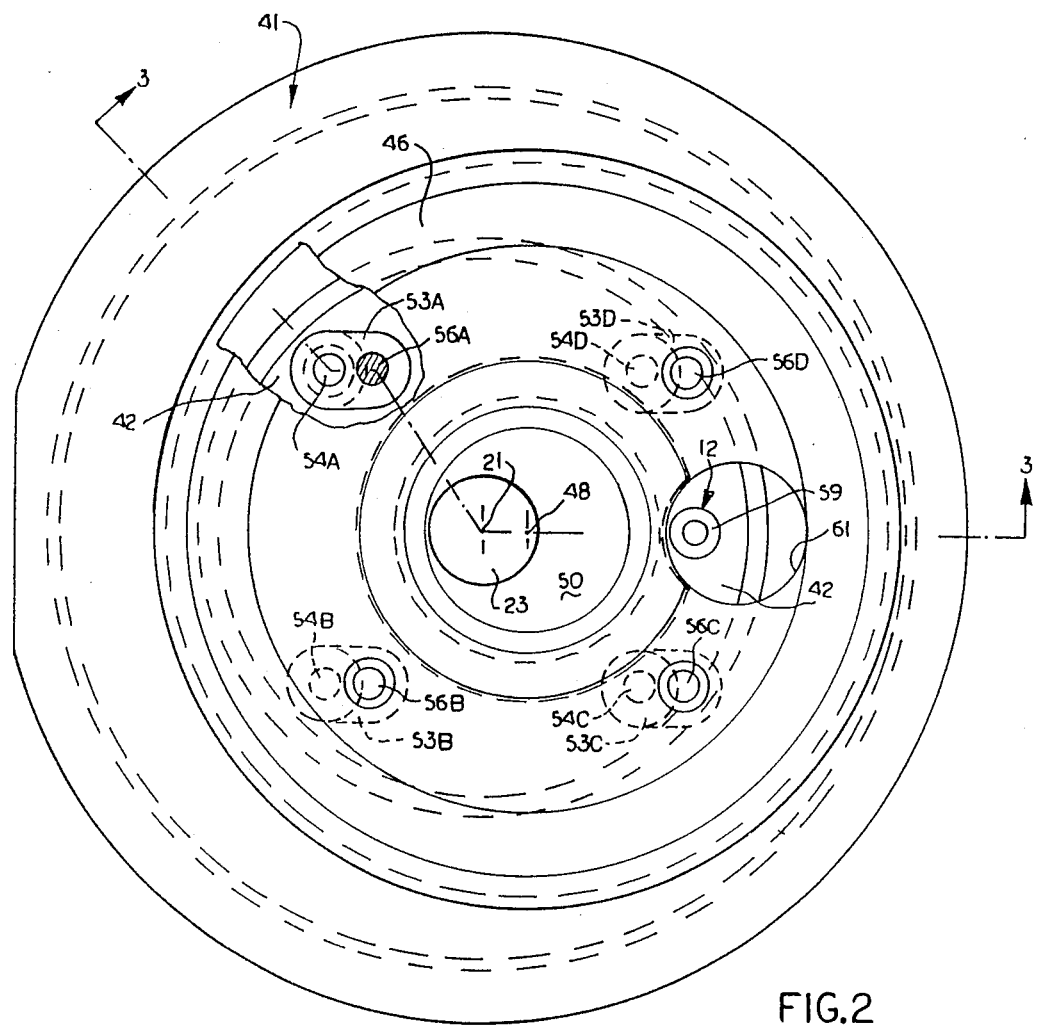
FIG. 2 is a plan view of the eccentric drive which operates to prevent rotation of the shed form support.
Figure 3:
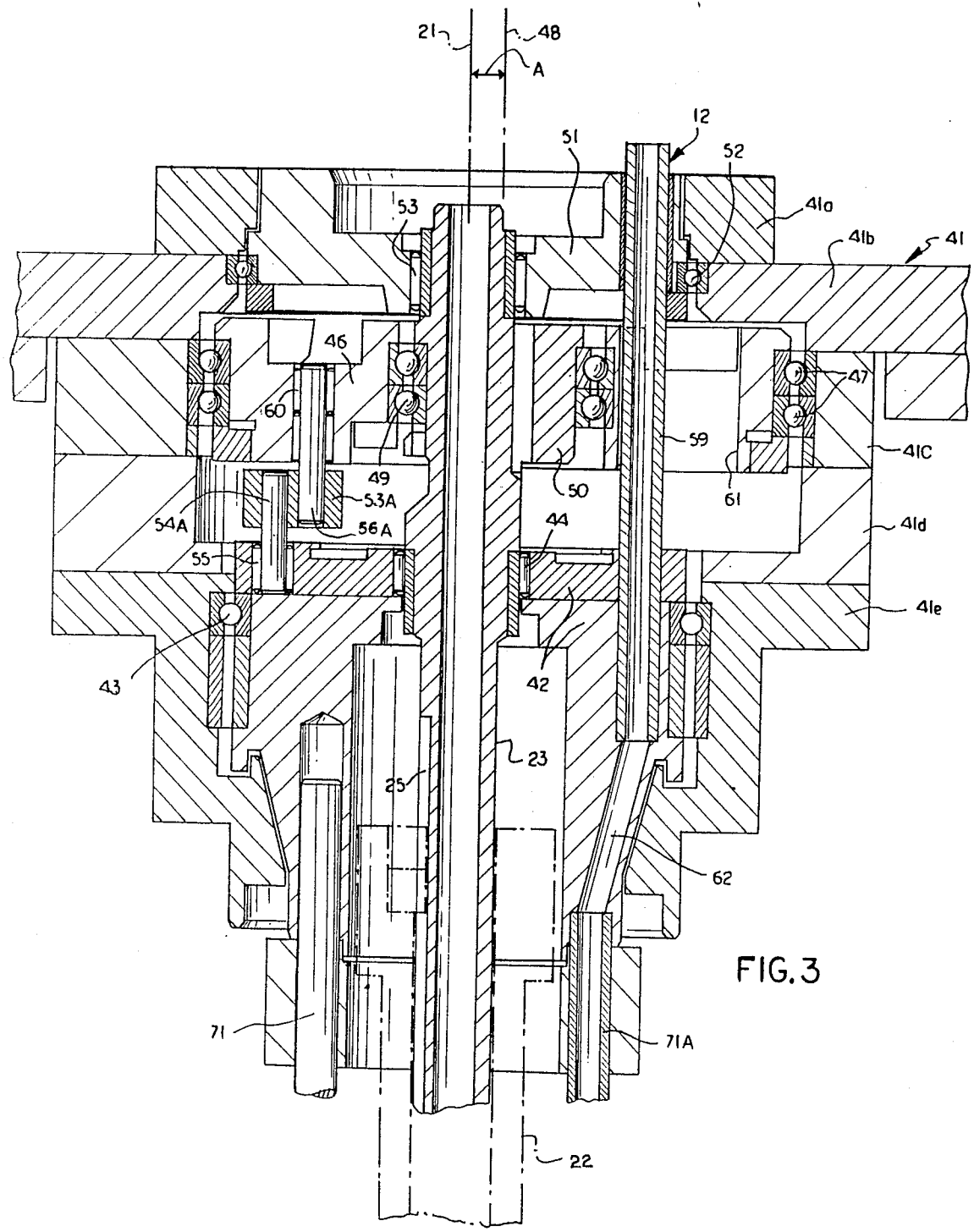
FIG. 3 is a longitudinal section, taken along line 3—3 of FIG. 2.

FIGS. 2 and 3 illustrate the structural detail of the eccentric drive system which mechanically locks the support shafts 22 and 23 and the form 18 against rotation. Such eccentric drive system also acts as the upper support portion of the flyer system. The eccentric drive system 31 includes a stationary frame 41 of the machine. Such stationary frame 41 includes an assembly of frame elements 41a through 41e which are interconnected by fasteners and pins (not illustrated) to provide a unitary frame assembly. An upper flyer support housing 42 is supported within the frame 41 by a bearing 43 for rotation about the central axis 21. Supported within the upper flyer support housing 42 by a bearing 44 is the upper form support shaft 23. The two bearings 43 and 44 are concentric so the shaft 23 is laterally positioned within the housing by the two bearings so that it extends along the central axis 21.

Positioned above the support housing 42 is an eccentric ring 46 journaled in the frame 41 by bearings 47 for rotation about an eccentric axis 48 parallel to but spaced from the central axis 21 by a predetermined distance A. Positioned within the eccentric ring 46 is an eccentric cam 50 formed on the upper form support shaft 23. Such eccentric cam is circular in cross section around the eccentric axis 48. A bearing 49 interconnects the eccentric cam 50 and the eccentric ring 46 for relative rotation about the eccentric axis 48.

Positioned above the eccentric cam 50 and the eccentric ring 46 is an upper bearing plate 51 journaled in a bearing 52 for rotation within the frame 41 around the central axis 21. An inner bearing 53 interconnects the upper end of the upper form support shaft 23 and the upper bearing plate for relative rotation about the central axis 21. The upper bearing plate 51, in cooperation with the upper flyer support housing therefor, supports the upper form support shaft 23 in a vertical position along the central axis 21 of the machine. However, they do not themselves restrain such shaft 23 against rotation.

As illustrated in FIGS. 2 and 3, drive links 53A through 53D interconnect the eccentric ring 46 and the upper flyer support housing 42 for co-rotation. These four drive links are identical in dimension and are each connected to the upper flyer support housing by an associated pivot pin 54A through 54D, each of which is locked at its upper end of the associated drive link and extends into an associated bearing 55 in the support housing 42. Only one drive link 53A appears in the longitudinal section of FIG. 3 but, as illustrated in FIG. 2, the various drive links are symmetrically positioned around the axes 21 and 48, with the drive pins 54A through 54D being equally spaced from the central axis 21. The other end of each drive link 53A through 53D is provided with a second drive pin 56A through 56D, which extends up into an associated bearing 60 mounted in the eccentric ring 46.

The spacing between the axes of each of the drive pins 54A through 54D and the associated drive pins 56A through 56D is equal to the spacing A between the two axes 21 and 48. Further, the structure is arranged so that each of the associated drive pins 54A through 54D and 56A through 56D are positioned relative to each other in a direction which is parallel to the direction of the spacing between the two axes 21 and 48. As a consequence, each of the links forms a parallelogram linkage system 58A through 58D (illustrated in FIGS. 4a through 4c) which causes each of the links to remain parallel to the spacing between the two axes 21 and 48 as the upper flyer support housing 42 and the eccentric ring 46 rotate. Such connection provides a 1:1 drive in which the housing 42 and the eccentric ring 46 rotate with uniform velocity.

The wire guide feed passage system 12 includes an upper tubular guide member 59 mounted at its upper end in the upper bearing plate 51, at its lower end in the housing 42, and is open at its lower end to an inclined passage 62. The guide member 59 extends through a circular opening or window 61 in the eccentric ring 46. The tubular member 59 provides a mechanical connection between the upper bearing plate 51 and the upper flyer support housing 42 which causes them to rotate in unison. It also serves as the first part of the wire feed passage through which the wire passes from the coil 10 to the form 18.

Figure 4A:
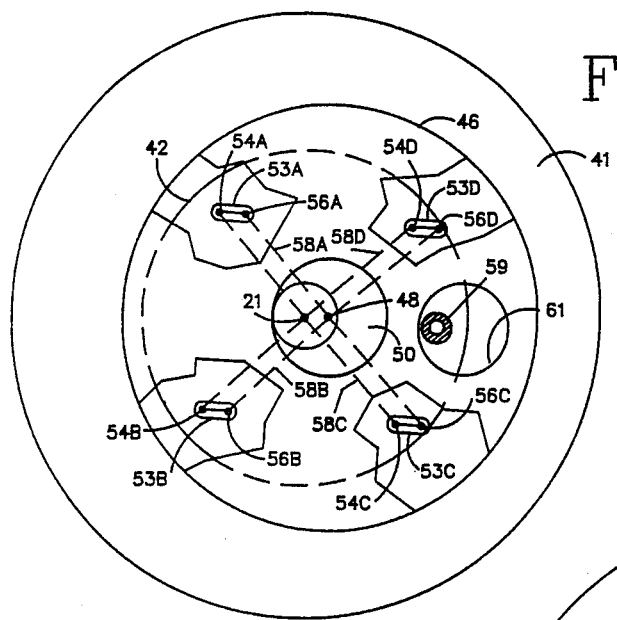
FIGS. 4A through 4C are schematic plan views of the eccentric drive mechanism in progressive positions through which the mechanism moves.
Figure 4B:
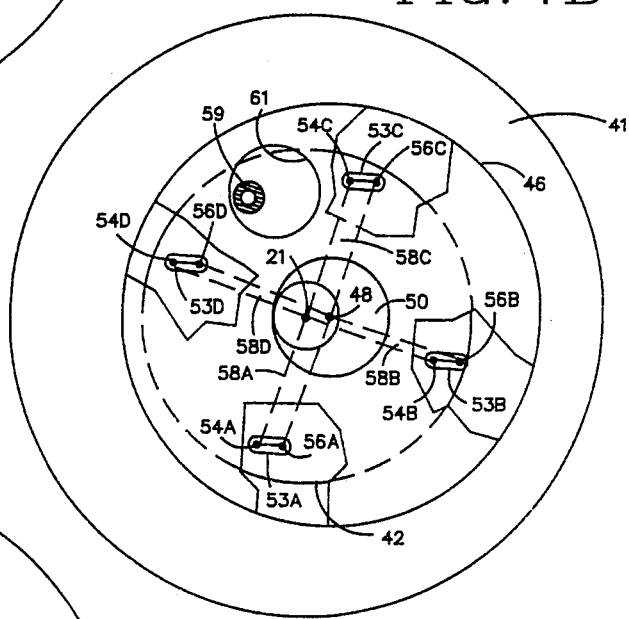
Figure 4C:
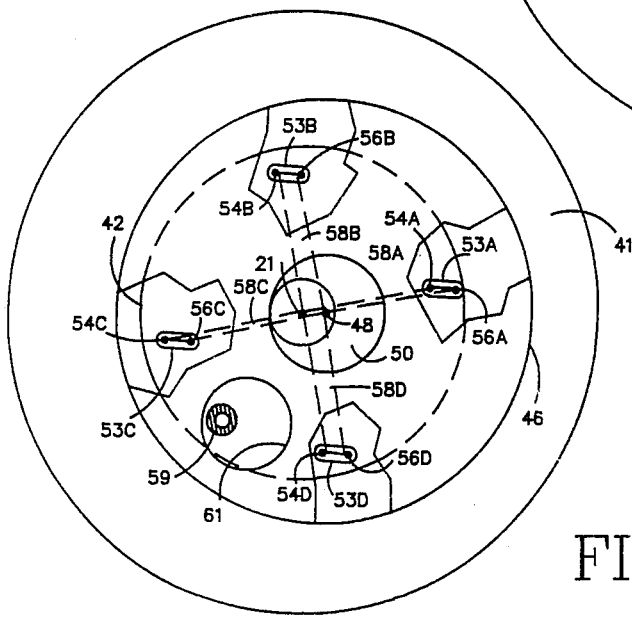

The manner in which the eccentric drive 31 operates is best illustrated in the schematic views of FIGS. 4A through 4C. These figures illustrate the drive linkage in three progressive positions 120 degrees apart.

Referring first to FIG. 4A, the upper flyer support housing 42 is illustrated below the eccentric ring 46. The housing 42 as indicated above is journaled within the basic machine frame for rotation about the central axis 21. Similarly, as indicated above, the eccentric ring 46 is journaled in the frame for rotation about the eccentric axis 48. The four links 53A through 53D are pivotally connected to the housing 42 by pivot pins 54A through 54D, respectively, and are also connected at their opposite ends to the eccentric ring 46 by pivot pins 56A through 54D, respectively. The axes of the four drive pins 54A through 54D are equidistant from the central axis 21 and are symmetrically positioned around the axis 21 ninety degrees apart. Similarly, the axes of the drive pins 56A through 56D are equally spaced from the axis 48 and are symmetrically positioned around the eccentric ring 46 ninety degrees apart. Further, the spacing between the axes of the drive pins 54A through 54D and the central axis 21 is equal to the spacing between the axes of the drive pins 56A through 56D and the eccentric axis 48. Finally, the spacing between the central axis 21 and the eccentric axis 48 is equal to the spacing between the associated axes 54A through 54D and 56A through 56D. Consequently, parallelogram linkages are provided, as indicated by the four dotted parallelograms 58A through 58D. In the position of FIG. 4A, the tubular member 59 extends up through the circular opening or window 61 along the side of the window closest to the eccentric axis 48. The diameter of the window is sized so that a small clearance is provided between the tubular member 59 and the wall of the window.

Assuming that the housing 42 is driven in an anti-clockwise direction, it moves progressively to the position of FIG. 4B 120 degrees of rotation from the position of FIG. 4A. As such movement occurs, the window 61 and the drive pins 56A through 56D rotate in an anti-clockwise direction about the axis 48 through 120 degrees. Similarly, the tubular member 59 and the drive pins 54A through 54D rotate in an anticlockwise direction around the central axis 21 through 120 degrees. Therefore, the drive links remain parallel to the eccentricity of the two axes 21 and 48.

Because the eccentric ring 46 is journaled in the frame 41 for rotation about the eccentric axis 48, and because the eccentric ring 46 and the cam 50 are connected by the bearing 49 for relative rotation about the eccentric axis 48, the cam 50 remains stationary as the eccentric ring rotates. Therefore, the eccentric ring 46 functions to hold the upper support shaft stationary even though the eccentric ring is rotating. In effect, the eccentric ring produces rotation of the eccentric cam relative to the eccentric ring at the same speed as the rotation of the eccentric ring, but in the opposite direction.

Relative movement does occur, however, between the tubular member 59 and the window 61, as best indicated by comparing FIGS. 4A and 4B. Because the links remain parallel to each other and to the direction of the spacing between the two axes 21 and 48, a uniform rotation occurs between the housing 42 and the eccentric ring, with each moving through 120 degrees until the position of FIG. 4B is reached. In effect, the tubular member 59 orbits around the window 61 without touching the window walls in any way. Consequently, the rotation of the eccentric ring does not interfere in any way with the position of the tubular member 59 as it rotates about the central axis 21.

During continued rotation through 120 degrees from the position of FIG. 4B to the position of FIG. 4C, the drive links 53A through 53D all remain parallel to each other and parallel to the eccentricity of the two axes 21 and 4B, so uniform rotation is provided. Similarly, the eccentric cam 50 continues to be held in a fixed position. Here again, the tubular member tends to orbit around the window 61, again with no contact between such parts. Continued further rotation through 120 degrees brings the system back to the position of FIG. 4A.

By comparing these figures of progressive positions of FIGS. 4A through 4C, it is apparent that the eccentric drive mechanism maintains the eccentric cam 50 of the upper support shaft 23 against rotation. With this structure, all of the various rotating elements rotate with a uniform velocity around respective axes; therefore, full dynamic balance can be achieved. Even the systems of links 53A through 53D are dynamically balanced. Since all of the parts are rotating with uniform velocity in a balanced manner, vibration is not a problem even when the drive is functioning at relatively high speeds on the order of 2500 rpm or more.

With this drive mechanism, it is possible to support the upper support shaft within the rotating environment of the tubular member 59 which constitutes a portion of the wire feed passage. Such drive provides a mechanical system for holding the upper form support shaft 23 against rotation in a fixed position extending along the center axis 21 of the machine. This is accomplished without gearing and without any sliding parts. All of the surfaces are provided with rotary bearings which are very dependable in operation and are capable of long service without any appreciable maintenance. Further, since all of the principal members of the eccentric drive system 31 have circular working surfaces, they can be accurately produced by simple low cost turning and boring processes. It should be understood that the various bearings are preferably antifriction bearings, and that suitable lubrication systems within the skill of persons skilled in the art should be provided to ensure that all of the bearings are properly lubricated. However, for purposes of simplification of the drawings, lubrication passages have not been illustrated.

In the illustrated embodiment, there are four symmetrically positioned drive links 53A through 53D. However, it should be understood that a correct 1:1 drive will be provided so long as two links, which are not spaced apart 180 degrees, connect the housing 42 to the eccentric ring 46. So long as at least two links are provided which are out-of-phase, one link continues to provide a drive when the other link is passing through a dead-center position. However, since only two links which are out-of-phase would not provide a dynamically balanced system, it is preferable to provide three or more links symmetrically spaced around the axes 21 and 48. In such a drive with three or more symmetrically located links, the out-of-phase requirement for preventing problems when links pass through dead-center conditions is avoided and dynamic balance is achieved. Therefore, although four drive links are provided in the illustrated embodiment, the invention herein is not limited to that specific number of drive links.

Referring again to FIG. 1, the upper flyer support housing 42 is connected to the flyer 13 by four symmetrically positioned, tubular drive pins 71. One of such drive pins 71A is mounted at its upper end in the upper flyer support housing in alignment with the wire feed passage 62 in such housing. Consequently, the drive pin 71A constitutes part of the wire feed passage system.

Because the flyer 13 is connected to the upper flyer support housing 42 by the four drive pins 71, they are connected together in a positive mechanical manner and rotate in unison. Therefore, it is not necessary to provide a direct motor drive for the eccentric drive system and a single motor 34 provides the power to rotate both the upper and lower ends of the machine. Further, because the upper and lower parts of the machine are mechanically interconnected, it is not necessary to provide special timing means.

The jump drive system 32 includes a non-rotating jump drive plate 72 mounted on the machine frame for movement in the direction of the central axis 21. Suitable guide pins are provided for the support of the drive plate 72 to hold it against rotation, while allowing for such axial movement. In order to simplify the drawings, however, such support pins are not illustrated. The drive plate 72 has a circular opening 70 extending around the drive pins 71 coaxial with the central axis 21. Journaled in such opening 70 by a bearing 73 is a bearing plate 74 which is rotatable within the bearing 73 about the central axis 21. The four drive pins 71 extend through the bearing plate 74 with a slide fit, so that the bearing plate 74 rotates with the drive pins 71 about the central axis 21 but is free to move axially along such axis. The lower form support shaft 22 is journaled within the bearing plate 74 by a bearing 76 so that such support shaft 22 is radially positioned within the jump drive system but is free to remain fixed against rotation within the rotating bearing plate.

The two bearings 73 and 76 are thrust-type bearings, so that when the actuator 33 moves the drive plate 72 along the central axis 21 of the machine, the lower form support shaft also moves axially within the machine. Consequently, the jump drive actuator, which is located externally of the drive pins, functions to produce desired axial movement of the lower form support shaft and the form 18, while the eccentric drive system, through the upper form support shaft, prevents rotation of the form.

With this jump drive system, the mass which must be moved along the axis 21 is relatively small and includes only the jump drive system 32, the lower form support shaft 22, and the form 18. Consequently, it is possible to very rapidly move the forms from one position to the next during the winding operation. Preferably, a jump latch system of the type illustrated in my U.S. Pat. No. 3,575,219 is provided to facilitate very rapid jumplike movements of the form when such movement is required. Such patent is incorporated herein by reference to illustrate the structural detail of such latching systems.

With the present invention, the form 18 is supported and held against rotation by the eccentric drive system 31, even though the wire feed passage rotates around the entire system and, in effect, provides a rotating envelope in which the form and its supporting structure are totally enclosed. The eccentric drive system provides a positive mechanical interconnection to lock the form against rotation, even though the support is contained within this rotating environment or envelope.

The jump drive system similarly provides a positive mechanical drive to produce the axial movement of the form, even though the actuator is located outside of the rotating envelope. Here again, positive mechanical connections are provided. With this system, reliable operation is achieved at virtually any desired speed, and the use of gears and slide pins is completely eliminated. Still further, rapid jumping movement of the form is attained with a minimum of power required because the mass which is jumped is relatively small.

Although the preferred embodiment of this invention has been shown and described, it should be understood that various modifications and rearrangements of the parts may be resorted to without departing from the scope of the invention as disclosed and claimed herein.

What is claimed is:

1. A coil winder comprising a form, flyer means rotatable about a first axis including a flyer operable to wind wire coils on said form, means for rotating said flyer means, a source of wire, said flyer means including wire guide means rotatable about said first axis operable to guide wire from said source to said flyer, a form support supporting said form and journaled in said flyer means for rotation relative thereto about said first axis, an eccentric member rotatable about a second axis spaced from and parallel to said first axis, a first connection operatively connecting said flyer means and said eccentric member causing said eccentric member to rotate in timed relation to said flyer means and at the same cyclic speed, and a second connection between said eccentric member and form support preventing rotation of said form support.

2. A coil winder as set forth in claim 1, wherein said eccentric provides a clearance opening, and said wire guided by said guide means extends through said opening with clearance.

3. A coil winder as set forth in claim 2, wherein said guide means extends through said opening with clearance.

4. A coil winder as set forth in claim 1, wherein said first connection includes at least two drive links pivoted at one location on said flyer means and at a second location on said eccentric, said drive links forming a parallelogram linkage with said first and second axes, said drive links being peripherally spaced around said first and second axes by an angle different from 180 degrees.

5. A coil winder as set forth in claim 4, wherein there are at least three of said drive links, and said drive links are symmetrically positioned around said axes so that said drive links dynamically balance each other.

6. A coil winder as set forth in claim 5, wherein actuator means are connected to said form operable to move said form in a direction parallel to said axes.

7. A coil winder as set forth in claim 5, wherein said flyer means includes first and second flyer support portions spaced from each other along said axes, said form support being journaled at spaced locations at each of said flyer support portions and extending therebetween, a mechanical connection interconnecting said flyer support portions for rotation in unison, and actuator means connected to said form support between said flyer support portions operable to move at least a portion of said form support and said form in a direction parallel to said axes.

8. A coil winder as set forth in claim 7, wherein said mechanical interconnection includes an element extending generally parallel to said first axis and rotating about said first axis with said flyer means, said actuator means including a rotatable member journaled for rotation with said flyer means around said first axis and axially movable relative to said element.

9. A coil winder as set forth in claim 8, wherein said element is part of said wire guide means.

10. A coil winder as set forth in claim 9, wherein said actuator means includes a linear actuator laterally spaced from said first axis and fixed against rotation around said first axis, said rotatable member being connected to said linear actuator for rotation relative thereto about said first axis.

11. A coil winder as set forth in claim 10, wherein said form support includes two telescoping members extending along said first axis, one of said telescoping members being fixed against axial movement and the other of said telescoping members being movable along said first axis, said form being mounted on said second telescoping member.

12. A coil winder as set forth in claim 11, wherein said form is a shed form, and tooling is provided to receive coils shed from said form.

13. A coil winder as set forth in claim 1, wherein said flyer means includes first and second flyer support portions spaced from each other along said axes, said form support being journaled at spaced locations in each of said flyer support portions and extending therebetween, a mechanical connection interconnecting said flyer support portions for rotation in unison, and actuator means connected to said form support between said flyer support portions operable to move at least a portion of said form support and said form in a direction parallel to said axes.

14. A coil winder as set forth in claim 13, wherein said mechanical interconnection includes an element extending between said flyer support portions and rotating around said first axis with said flyer, and said actuator means includes a rotatable member journaled for rotation with said flyer means around said first axis and axially movable relative to said flyer means.

15. A coil winder as set forth in claim 14, wherein said element is part of said wire guide means.

16. A coil winder as set forth in claim 15, wherein said actuator means includes a linear actuator laterally spaced from said first axis and fixed against rotation around said first axis, said rotatable member being connected to said linear actuator for rotation relative thereto about said first axis.

17. A coil winder as set forth in claim 6, wherein said mechanical connection includes a plurality of cylindrical pins extending parallel to said first axis and symmetrically positioned around said first axis, said pins being connected at one end to one flyer support portion and at the other end to the other flyer support portion, said actuator means including a rotatable member journaled for rotation with said flyer means around said first axis and slidable along said pins, at least one of said pins being tubular and providing part of said wire guide means.

18. A coil winding machine comprising a frame, a form, a flyer support journaled in said frame for rotation about a first axis, means for rotating said flyer support, an eccentric journaled in said frame for rotation about a second axis parallel to said first axis and spaced therefrom in a predetermined direction by a predetermined distance, a winding form support for supporting said form and journaled in said flyer support for rotation relative thereto about said first axis, drive links interconnecting said flyer support and said eccentric, each drive link being pivotally connected to said flyer support for rotation relative thereto about a third axis and pivotally connected to said eccentric for rotation relative thereto about a fourth axis, said third and fourth axes being parallel to said first and second axes and spaced from each other in said predetermined direction by said predetermined distance, said drive links causing said flyer support and eccentric to rotate about the respective axes in the same direction at the same speed, an eccentric drive interconnecting said form support and said eccentric for relative rotation about said second axis, said eccentric drive causing said form support to remain fixed against rotation as said flyer support and eccentric rotate, said flyer support providing a wire guide spaced from said first and second axes along which wire moves lengthwise of said flyer support, and a clearance opening in said eccentric through which said wire guide passes.

19. A coil winding machine as set forth in claim 18, wherein actuator means are connected to move said form support axially along said first axis.

20. A shed coil winder comprising flyer means rotatable around a first axis, means for rotating said flyer means, a shed form, said flyer means including a flyer rotatable about said first axis operable to wrap wire coils on said form and a wire guide rotatable about said first axis operable to guide wire to said flyer, a form support supporting said shed form and journaled in said flyer means for rotation relative thereto about said first axis, an eccentric ring journaled for rotation about a second axis spaced from and parallel to said first axis, drive means interconnecting said flyer means and said eccentric ring for corotation about their respective axes, and said eccentric ring holding said form support against rotation, said eccentric ring providing an opening through which said wire guide extends with clearance.

21. A shed coil winder as set forth in claim 20, wherein a jump actuator is connected to said form operable to move said form axially along said axes.

22. A drive mechanism comprising a first member journaled for rotation about a first axis, means for rotating said first member, a second member journaled in said first member for rotation relative thereto about said first axis, and an eccentric drive means interconnecting said first and second members, said eccentric drive means including an eccentric, a first connection operatively connected between said eccentric and said first member causing said eccentric to rotate with said first member about an eccentric axis spaced from and parallel to said first axis, a second connection between said eccentric and said second member causing said second member to rotate relative to said eccentric in a direction opposite to said rotation of said eccentric to hold said second member against rotation when said first member and said eccentric rotate.

* * * * *